United States Patent
Gao et al.

(10) Patent No.: US 11,110,811 B2
(45) Date of Patent: Sep. 7, 2021

(54) THIN HAUL HYBRID ELECTRIC PROPULSION SYSTEM

(71) Applicant: The Boeing Company, Chicago, IL (US)

(72) Inventors: Lijun Gao, Renton, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 261 days.

(21) Appl. No.: 16/215,073

(22) Filed: Dec. 10, 2018

(65) Prior Publication Data
US 2020/0180454 A1 Jun. 11, 2020

(51) Int. Cl.
| | |
|---|---|
| B60L 53/24 | (2019.01) |
| H02J 4/00 | (2006.01) |
| H02J 7/14 | (2006.01) |
| H02J 7/02 | (2016.01) |
| B64D 27/24 | (2006.01) |
| B64C 13/50 | (2006.01) |
| B64D 27/02 | (2006.01) |

(52) U.S. Cl.
CPC .............. *B60L 53/24* (2019.02); *B64C 13/50* (2013.01); *B64D 27/02* (2013.01); *B64D 27/24* (2013.01); *H02J 4/00* (2013.01); *H02J 7/02* (2013.01); *H02J 7/1423* (2013.01); *H02J 7/1438* (2013.01); *B60L 2200/10* (2013.01); *B60L 2210/30* (2013.01); *B64D 2027/026* (2013.01)

(58) Field of Classification Search
None
See application file for complete search history.

(56) References Cited

U.S. PATENT DOCUMENTS

| | | | | |
|---|---|---|---|---|
| 5,899,411 A | * | 5/1999 | Latos | B64D 33/00 244/53 A |
| 2010/0026089 A1 | * | 2/2010 | Anghel | H02J 4/00 307/9.1 |
| 2010/0080030 A1 | * | 4/2010 | Wiegman | H02M 5/4585 363/131 |
| 2011/0222200 A1 | * | 9/2011 | Fuller | H01H 9/548 361/100 |
| 2012/0019212 A1 | * | 1/2012 | Krauer | H02J 5/00 320/137 |
| 2015/0103457 A1 | * | 4/2015 | Shander | H02J 3/381 361/88 |
| 2015/0183385 A1 | * | 7/2015 | Iwashima | B64D 41/007 307/9.1 |

* cited by examiner

*Primary Examiner* — Jared Fureman
*Assistant Examiner* — Joel Barnett
(74) *Attorney, Agent, or Firm* — Parsons Behle & Latimer

(57) ABSTRACT

A hybrid electric propulsion system may include an independent speed variable frequency (ISVF) generator coupled to an alternating current (AC) bus via a first switch. The system may further include a variable frequency independent speed (VFIS) motor coupled to the AC bus via a second switch, the system omitting circuitry to perform a full-power rated power conversion between the ISVF generator and the VFIS motor. The system may also include an alternating current direct current (AC/DC) converter coupled to the AC bus via a third switch. The system may include a battery coupled to the AC/DC converter.

20 Claims, 13 Drawing Sheets

THIN HAUL HYBRID ELECTRIC PROPULSION SYSTEM

FIELD OF THE DISCLOSURE

This disclosure is generally related to the field of hybrid electric propulsion, and in particular, to a hybrid electric propulsion system for a vehicle, such as an aircraft.

BACKGROUND

Power distribution within vehicles, such as aircraft, may present several challenges, including power conversion losses, meeting weight requirements, enabling sufficient cooling, and other difficulties. In particular "thin haul" aircraft, which may be used for shorter flights with less cargo and/or fewer passengers may add to the difficulty.

Generators and electric propulsion motors used in thin haul aircraft may add significant weight to the aircraft. The added weight may increase fuel consumption and the associated costs with operating the aircraft. Lighter and more efficient generators and motors may not produce sufficient power to drive a propulsion system, particularly during take-off and climb. Further, many typical generators and electric propulsion motors rely on full power rated power conversions, which may result in significant power losses and add weight with additional circuitry. Also, conversion circuitry may rely on liquid cooling systems, which add additional weight, complexity, and power consumption. Other disadvantages may exist.

SUMMARY

Disclosed herein is a power distribution system and method that may overcome at least some of the disadvantages described above. The system may be a hybrid system having at least one channel including both a battery and a generator to power a propulsion load. Different configurations of the system may also enable the powering of other systems of a vehicle, such as non-propulsion motor loads and avionics loads. The battery may also be used for engine startup.

In an embodiment, a hybrid electric propulsion system includes an independent speed variable frequency (ISVF) generator coupled to an alternating current (AC) bus via a first switch. The system further includes a variable frequency independent speed (VFIS) motor coupled to the AC bus via a second switch, the system omitting circuitry to perform a full-power rated power conversion between the ISVF generator and the VFIS motor. The system also includes an alternating current direct current (AC/DC) converter coupled to the AC bus via a third switch. The system includes a battery coupled to the AC/DC converter.

In some embodiments, the system includes an external power port coupled to the AC bus via a fourth switch. In some embodiments, the system includes a direct current (DC) bus, and a direct current direct current (DC/DC) converter coupled to the DC bus via a fifth switch. In some embodiments, the VFIS motor drives a propulsion load and the system further includes a second VFIS motor coupled to the AC bus via a sixth switch, the second VFIS motor driving a non-propulsive motor load. In some embodiments, the system includes a sixth switch, the battery coupled to both the AC/DC converter and the DC/DC converter via the sixth switch. In some embodiments, the first switch, the second switch, and the third switch are contactors, each contactor including an electro-mechanical circuit breaker or a solid-state power controller (SSPC). In some embodiments, the system includes a second ISVF generator coupled to a second AC bus via a first additional switch, the AC bus coupled to the second AC bus via a central switch.

In some embodiments, the system includes a second VFIS motor coupled to the second AC bus via a second additional switch, the system omitting circuitry to perform a full-power rated power conversion between the second ISVF generator and the second VFIS motor. In some embodiments, the system includes a second AC/DC converter coupled to the AC bus via a third additional switch. In some embodiments, the system includes a second battery coupled to the second AC/DC converter. In some embodiments, the system includes a first power channel and a second power channel, where the ISVF generator, the VFIS motor, the AC/DC converter, and the battery correspond to the first power channel, where the second ISVF generator, the second VFIS motor, the second AC/DC converter, and the second battery correspond to the second power channel.

In an embodiment, a method for hybrid electric propulsion includes electrically connecting an ISVF generator to an AC bus. The method further includes electrically connecting an AC/DC converter to the AC bus, the AC/DC converter electrically connected to a battery. The method also includes electrically connecting a VFIS motor to the AC bus. The method includes driving the VFIS motor using a combination of the ISVF generator and the battery without performing a full-power rated power conversion between the ISVF generator and the VFIS motor.

In some embodiments, the method includes electrically connecting a DC/DC converter to a DC bus, the DC/DC converter electrically connected to the battery and powering the DC bus using the battery. In some embodiments, the method includes electrically disconnecting the AC/DC converter from the AC bus, powering the DC bus with the battery, and powering the AC bus with the ISVF generator. In some embodiments, the method includes electrically disconnecting the ISVF generator from the AC bus, electrically disconnecting the VFIS motor from the AC bus, electrically connecting an external power port to the AC bus, and charging the battery using the external power port. In some embodiments, the method includes electrically disconnecting the VFIS motor from the AC bus, electrically disconnecting the AC/DC converter from the AC bus, electrically connecting an external power port to the AC bus, and starting an engine using the external power port to power the ISVF generator.

In some embodiments, the method includes receiving a reverse load from a propulsion load attached to the VFIS motor, and charging the battery using a combination of the ISVF generator and the VFIS motor. In some embodiments, the method includes electrically disconnecting the VFIS motor from the AC bus and starting an engine using the battery. In some embodiments, the method includes electrically disconnecting the ISVF generator from the AC bus, electrically connecting a second ISVF generator to a second AC bus, electrically connecting the AC bus to the second AC bus, and powering the AC bus using the second ISVF generator. In some embodiments, the method includes electrically disconnecting a second AC/DC converter from the second AC bus, the second AC/DC converter electrically connected to a second battery, electrically connecting a second DC/DC converter to a DC bus, the second DC/DC converter electrically connected to the second battery, and powering the DC bus using the second battery.

In an embodiment, a method for hybrid electric propulsion includes coupling an ISVF generator to an AC bus at a first switch. The method further includes coupling a VFIS motor to the AC bus at a second switch. The method also includes driving the VFIS motor using at least the ISVF generator without performing a full-power rated power conversion between the ISVF generator and the VFIS motor. The method includes coupling an AC/DC converter to the AC bus via a third switch. The method further includes coupling a battery to the AC/DC converter.

In some embodiments, the method includes coupling an external power port to the AC bus via a fourth switch. In some embodiments, the method includes coupling a second VFIS motor to the AC bus via a sixth circuit breaker, wherein the VFIS motor drives a propulsion load, and wherein the second VFIS motor drives a non-propulsive motor load.

Figure 1:
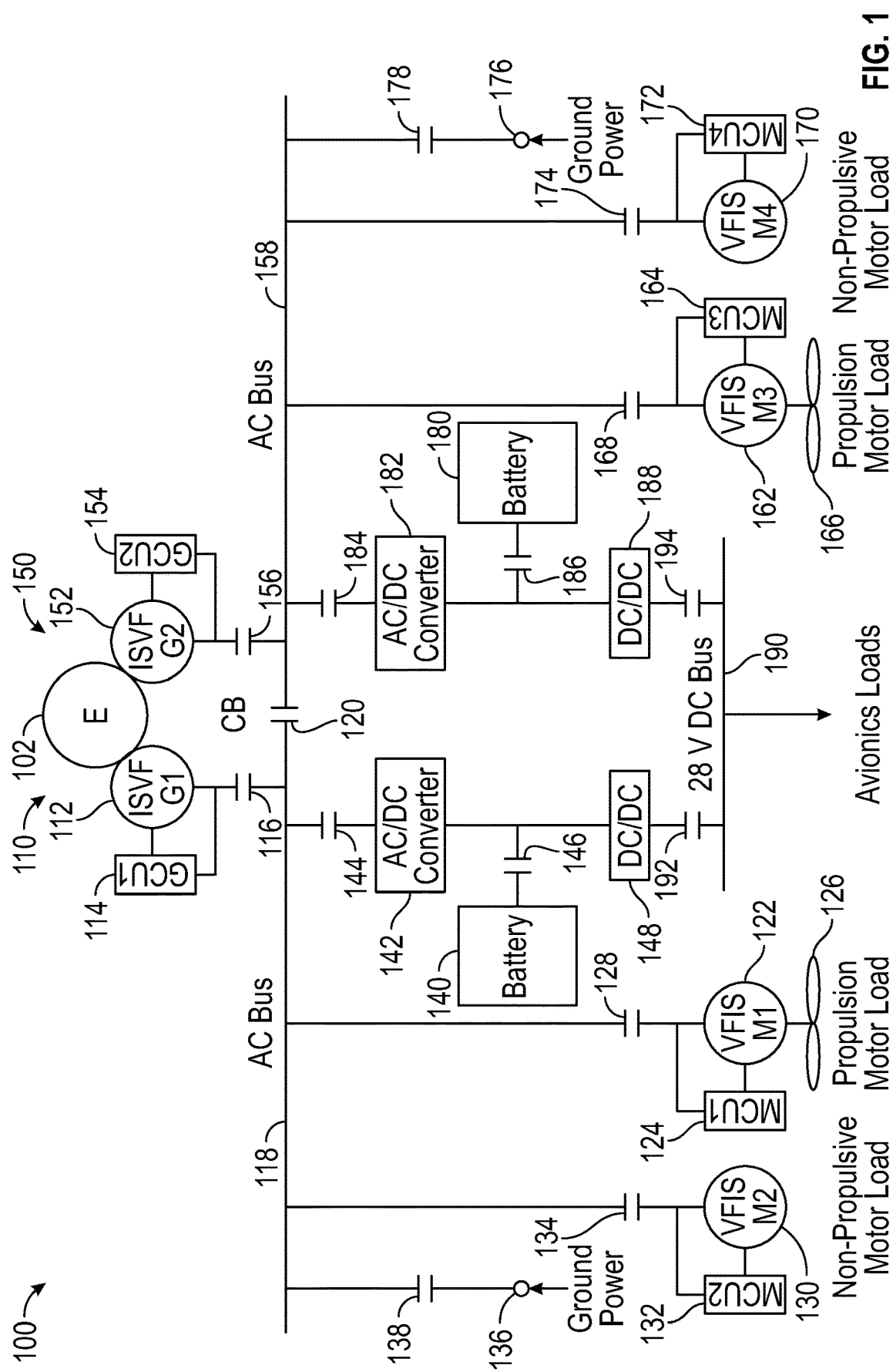
FIG. 1 is a block diagram depicting a hybrid electric propulsion system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, a hybrid electric propulsion system 100 is depicted, which may be installed within a vehicle, such as an aircraft. The system 100 may include an engine 102. Although FIG. 1 depicts only one engine 102, in some embodiments, the system 100 may include multiple engines. The engine 102 may be used to provide mechanical power to the vehicle.

The system 100 may be a multi-channel power distribution system and, as such, may include a first channel 110 associated with a first generator 112 and a second channel 150 associated with a second generator 152. Although, two generators 112, 152 are shown, in some embodiments, the system 100 may include more or fewer than two generators, and the generators may be attached to a single engine or multiple engines in varying combinations as would be appreciated by persons of ordinary skill in the art having the benefit of this disclosure. For ease of explanation, FIG. 1 depicts a single engine 102 coupled to two generators 112, 152 and associated with two channels 110, 150.

With respect to the first channel 110, the system 100 may include a first generator control unit 114 to control a frequency, amplitude, and phase of power generated by the first generator 112. For example, the first generator 112 may be an independent speed variable frequency (ISVF) generator. As an ISVF generator, the first generator 112 may be capable of generating an AC power signal having an adjustable frequency, amplitude, and phase, but without performing a full-power rated power conversion. An example of a generator capable of being used with the system 100 is further described in U.S. patent application Ser. No. 15/819,919, filed on Nov. 21, 2017 and entitled "Independent Speed Variable Frequency Alternating Current Generator," the contents of which are hereby incorporated herein, in their entirety.

As used herein, a "full-power rated power conversion" occurs when a converter carries a power level equal to that of a generator or a motor which it drives or controls. Full-power rated power conversions are typically performed by a rectifier circuit, which converts substantially all of the energy in a power signal from an AC signal to a DC signal, and by an inverter circuit, which converts substantially all of the energy in the power signal from a DC signal to an AC signal. The power losses during these conversions may be significant. Further, the hardware used to perform the conversions may add additional weight and complexity to a power distribution system. By omitting a full-power rated power conversion, the system 100 may not be subject to these shortcomings.

The first generator 112 may be coupled to a first alternating current (AC) bus 118 via a first switch 116. As used herein, "coupled to" is defined as being positioned in a same circuit path, with or without circuit breaks along the path, as opposed to "electrically connected," which means having no circuit breaks. For example, the first switch 116 may be used to selectively electrically connect or disconnect the first generator 112 to or from the first AC bus 118. However, regardless of the state of the first switch 116, the first generator 112 remains coupled to the first AC bus 118 because they are in the same circuit path.

The first switch 116, and each of the switches subsequently described herein may include any circuit capable of selectively electrically connecting or disconnecting a circuit. The switches may be controllable switches, which may have an automatic circuit protection function such as acting as a circuit breaker. The switches may be conventional electro-mechanical switches, or solid-state power controller (SSPC) switches. In some embodiments, switches may include contactors. Other types of switches are also possible.

The system 100 may include a first motor 122 coupled to the first AC bus 118 via a second switch 128. A first motor control unit 124 (MCU1) may control a rotational frequency of the first motor 122 independently from a frequency, amplitude, and phase of a power signal on the first AC bus 118. Further, the rotational frequency of the first motor 122 may be controlled without performing a full-power rated power conversion of the power signal on the first AC bus 118. As such, the system 100 may omit circuitry to perform a full-power rated power conversion anywhere between the first generator 112 and the first motor 122. The first motor 122 may be a variable frequency independent speed (VFIS) motor. An example of a motor capable of being used with the system 100 is further described in U.S. patent application Ser. No. 15/982,470, filed on May 17, 2018 and entitled "Variable Frequency Independent Speed Motor," the contents of which are hereby incorporated herein, in their entirety. The first motor 122 may drive a first propulsion load 126.

The system 100 may further include a first alternating current direct current (AC/DC) converter 142 coupled to the first AC bus 118 via a third switch 144. A first battery 140 may be coupled to the AC/DC converter 142. The first battery 140 may include any type of rechargeable battery, or collection of batteries. The AC/DC converter 142 may perform the functions of a battery charger relative to the first battery 140.

The system 100 may also include a first external power port 136 coupled to the first AC bus 118 via a fourth switch 138. The first external power port 136 may be configured to couple to an external power source, such as an aircraft maintenance vehicle, an airport electrical source, another source of electrical power, or combinations thereof.

The system 100 may include a direct current (DC) bus 190. A direct current direct current (DC/DC) converter 148 may be coupled to the DC bus 190 via a fifth switch 192. The DC bus 190 may provide power for avionics loads as well as for cabin electronics for passengers.

The system 100 may include a second motor 130 (VFIS M2) coupled to the first AC bus 118 via a sixth switch 134. A second motor control unit 132 (MCU2) may control a rotational frequency of the second motor 130 independently from a frequency, amplitude, and phase of a power signal on the first AC bus 118. Further, the rotational frequency of the second motor 130 may be controlled without performing a full-power rated power conversion of the power signal on the first AC bus 118. As such, the system 100 may omit circuitry to perform a full-power rated power conversion anywhere between the first generator 112 and the second motor 130. The second motor 130 may drive a non-propulsive motor load. For example, the second motor 130 may control flight control surfaces (e.g., ailerons, elevators, rudder, flaps, etc.). As with the first motor 122, the second motor 130 may be a VFIS motor.

The system 100 may include a seventh switch 146. The first battery 140 may be coupled to both the AC/DC converter 142 and the DC/DC converter 148 via the seventh switch 146. In some configurations, this may enable the AC/CD converter 142 to power the DC bus 190 without charging or drawing energy from the first battery 140. In other words, the first battery 140 may be capable of being isolated from the remaining portions of the system 100.

With respect to the second channel 150, the system 100 may include a second generator control unit 154 configured to control the second generator 152. For example, the second generator control unit 154 may control a frequency, amplitude, and phase of power generated by the second generator 152. As with the first generator 112, the second generator 152 may be an ISVF generator and may be capable of generating an AC power signal having an adjustable frequency, amplitude, and phase, but without performing a full-power rated power conversion.

As shown in FIG. 1, the system may be more-or-less symmetrical between the channels 110, 150. As such, for ease of explanation, switches associated with the second channel 150 may be described as additional switches, being additional to the switches associated with the first channel 110. For example, the second generator 152 may be coupled to a second AC bus 158 via a first additional switch 156, where the first additional switch 156 corresponds to the first switch 116 in the first channel 110.

The system 100 may include a third motor 162 (VFIS M3) coupled to the second AC bus 158 via a second additional switch 168. A third motor control unit 164 (MCU3) may control a rotational frequency of the third motor 162 independently from a frequency, amplitude, and phase of a power signal on the second AC bus 158. Further, the rotational frequency of the third motor 162 may be controlled without performing a full-power rated power conversion of the power signal on the second AC bus 158. For example, the third motor 162 may be a VFIS motor. The third motor 162 may drive a second propulsion load 166.

The system 100 may further include a second AC/DC converter 182 coupled to the second AC bus 158 via a third additional switch 184. A second battery 180 may be coupled to the second AC/DC converter 182. The second battery 180 may include any type of rechargeable battery, or collection of batteries. The AC/DC converter 182 may perform the functions of a battery charger relative to the second battery 180. A central switch 120 may enable the first AC bus 118 and the second AC bus 158 to be electrically coupled.

The system 100 may also include a second external power port 176 coupled to the second AC bus 158 via a fourth additional switch 178. As with the first external power port 136, the second external power port 176 may enable the system 100 to be powered by an external power source.

A second DC/DC converter 188 may be coupled to the DC bus 190 via a fifth additional switch 194. This may enable the DC bus 190 to be driven through the second channel 150, either by the second generator 152 or by the second battery 180.

The system 100 may include a fourth motor 170 coupled to the second AC bus 158 via a sixth additional switch 174. A fourth motor control unit 172 (MCU4) may control a rotational frequency of the fourth motor 170 independently from a frequency, amplitude, and phase of a power signal on the second AC bus 158. Further, the rotational frequency of the second motor 130 may be controlled without performing a full-power rated power conversion of the power signal on the second AC bus 158. As such, the system 100 may omit circuitry to perform a full-power rated power conversion anywhere between the second generator 152 and the fourth motor 170. The fourth motor 170 may drive a non-propulsive motor load and may be a VFIS motor.

The system 100 may include a seventh additional switch 186. The second battery 180 may be coupled to both the second AC/DC converter 182 and the second DC/DC converter 188 via the seventh additional switch 186, enabling selective isolation of the second battery 180.

The system 100 may be operated in several different modes by controlling which of the switches are open and which are closed. For example, the system 100 may be operated in an external power battery charging mode, an engine start by external power mode, a takeoff and climb mode, a cruise power distribution mode, a power distribution during descent and breaking mode, and engine start by battery mode, or a single generator power distribution mode. These modes are described further herein. Other modes are possible.

A benefit of the system 100 is that by including the batteries 140, 180, battery power may be used to drive some of the loads in the power distribution system 100. This may place less stress on the generators 112, 152. With power assistance from the batteries 140, 180, smaller capacity generators may be enabled, which in the case of aircraft, may result in lighter and more efficient components. Other advantages may exist.

Figure 2:
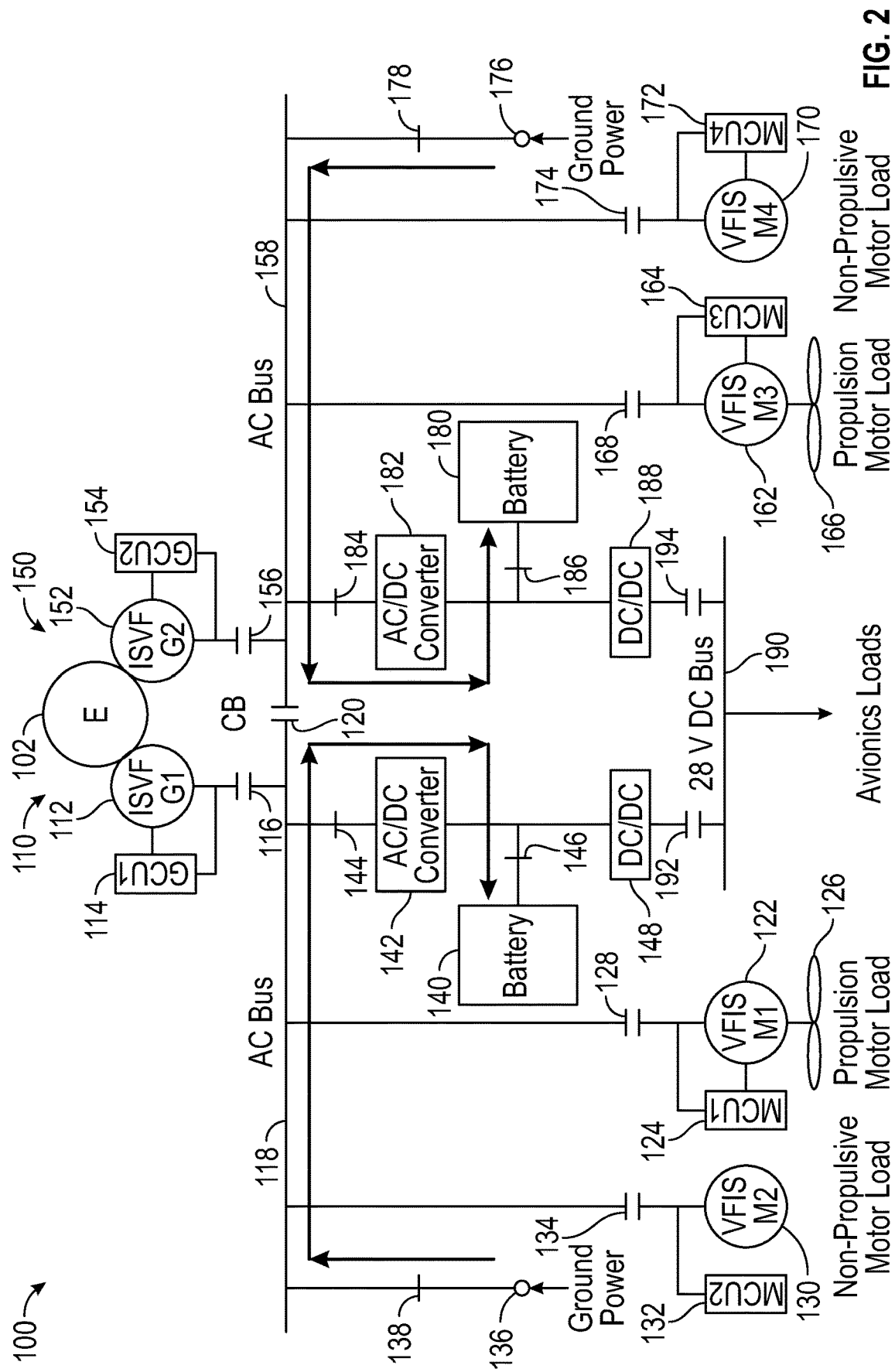
FIG. 2 is a block diagram depicting a hybrid electric propulsion system in an external power battery charging mode.

Referring to FIG. 2, the system 100 is depicted in a configuration that enables a ground battery charging mode. As shown in FIG. 2, the third switch 144, the fourth switch 138, and the seventh switch 146 may be closed in the first channel 110. The remaining switches 116, 128, 134, 192 of the first channel 110 may be open. As such, the first generator 112, the first VFIS motor 122, and the second VFIS motor 130 may be electrically disconnected from the first AC bus 118. The first external power port 136 may be electrically connected to the first AC bus 118. In this configuration, power may flow from the first external power port 136 to the first AC/DC converter 142. The first AC/DC converter 142 may generate a DC voltage to charge the first battery 140. As such, the first battery 140 may be charged by an external source. For example, the first battery 140 may be charged by an airport power source as an aircraft rests on the tarmac between flights.

As with the first channel 110, the second channel 150 may also be configured to enable charging of the second battery 180 through the second external power port 176. As shown in FIG. 2, the third additional switch 184, the fourth additional switch 178, and the seventh additional switch 186 may be closed, with the remaining switches 156, 168, 174, 194 of the second channel 150 may be open. As such, the second ISVF generator 152, the third VFIS motor 162, and the fourth VFIS motor 170 may be electrically disconnected from the second AC bus 158. The second external power port 176 may be electrically connected to the second AC bus 158. As such, power may flow from the second external power port 176 to the second AC/DC converter 182, which may generate a DC voltage to charge the second battery 180.

Further, although not depicted in FIG. 2, the central switch 120 may be closed to enable charging of both the batteries 140, 180 from only one of the external power ports 136, 176. Other configurations for charging the batteries 140, 180 are possible.

Figure 3:
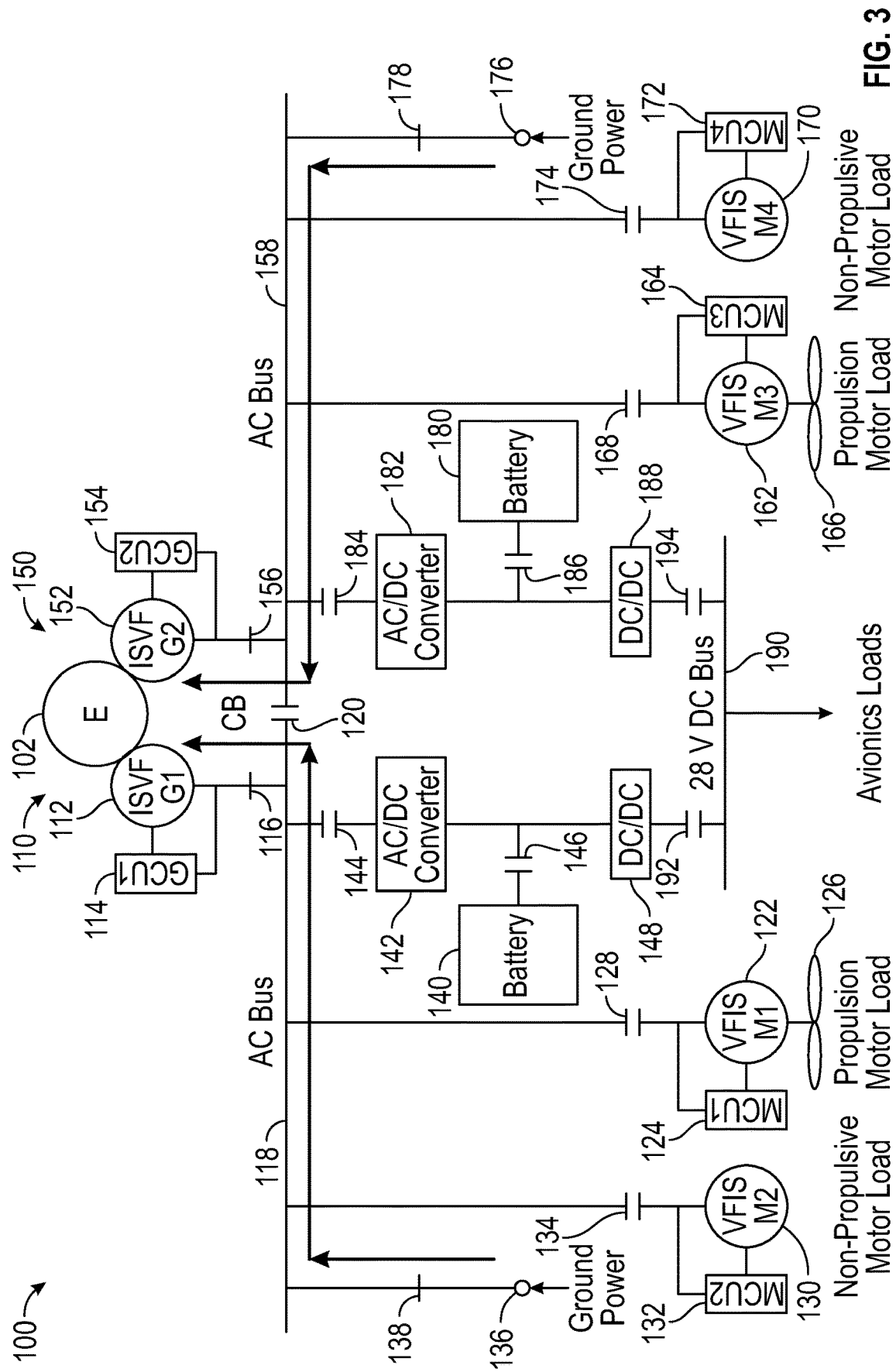
FIG. 3 is a block diagram depicting a hybrid electric propulsion system in an engine start by external power mode.

Referring to FIG. 3, the system 100 is depicted in a configuration that enables the engine 102 to be started by an external power source. As shown in FIG. 3, in the first channel 110, the first switch 116, and the fourth switch 138 may be closed. The remaining switches 128, 134, 144, 146, 192 may be opened. As such, the first motor 122, the second motor 130, and the first AC/DC converter 142 may be electrically disconnected from the first AC bus 118. The first external power port 136 and the first generator 112 may be electrically connected to the first AC bus 118. The first generator 112 may be operated in a motor mode and may be powered through the first external power port 136 to enable startup of the engine 102.

As with the first channel 110, the second channel 150 may also be configured to enable the engine 102 to be started by an external power source. As shown in FIG. 2, the first additional switch 156 and the fourth additional switch 178 may be closed, with the remaining switches 168, 174, 184, 186, 194 in the second channel 150 open. As such, the third motor 162, the fourth motor 170, and the second AC/DC converter 182 may be electrically disconnected from the second AC bus 158. The second external power port 176 and the second ISVF generator 152 may be electrically connected to the second AC bus 158. The second ISVF generator 152 may be operated in a motor mode and may be powered through the second external power port 176 to enable startup of the engine 102.

Further, although not depicted in FIG. 3, the central switch 120 may be closed to enable startup of the engine 102 from either of the external power ports 136, 176 in combination with either of the generators 112, 152. Other configurations for starting the engine 102 are possible.

Figure 4:
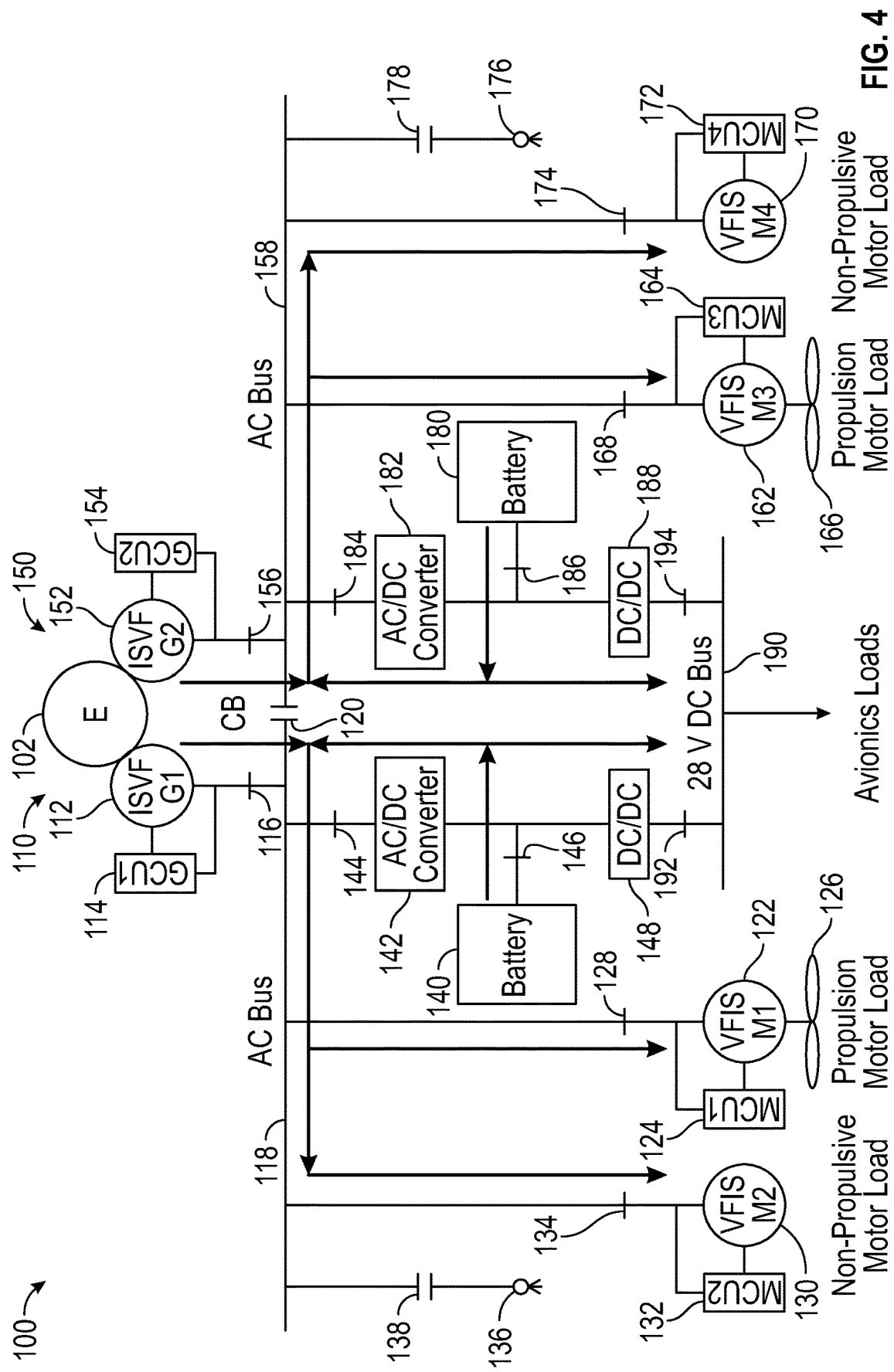
FIG. 4 is a block diagram depicting a hybrid electric propulsion system in a takeoff and climb mode.

Referring to FIG. 4, the system 100 is depicted in a configuration that enables power assistance by the batteries 140, 180 for takeoff and climb of an aircraft. As shown in FIG. 4, in the first channel 110, the first switch 116, the second switch 128, the third switch 144, the fifth switch 192, the sixth switch 134, and the seventh switch 146 may be closed. The remaining switches 138 in the first channel 110 may be opened. As such, the first generator 112 may be electrically connected to the first AC bus 118. The AC/DC converter 142 may be electrically connected to the first AC bus 118 with the first battery 140 being electrically connected to the AC/DC converter 142. The first motor 122 may also be electrically connected to the first AC bus 118. In this configuration, power may flow from both the first generator 112 and the first battery 140 to drive the first motor 122. This may be performed without a full-power rated power conversion between the first generator 112 and the first motor 122. Both the first generator 112 and the first battery 140 may also be used to drive the second motor 130.

Further, the first battery 140 may be used to drive the DC bus 190. For example, the DC/DC converter 148 may be electrically connected to the DC bus 190 and the battery 140 may be used to power the DC bus 190 in addition to assisting with powering the motor 122 and/or the motor 130.

In the second channel 150, the first additional switch 156, the second additional switch 168, the third additional switch 184, the fifth additional switch 194, the sixth additional switch 174, and the seventh additional switch 186 may be closed. The remaining switches 178 in the second channel 150 may be opened. This may enable the third motor 162, the fourth motor 170, or both, to be driven by a combination of the second generator 152 and the second battery 180.

Figure 5:
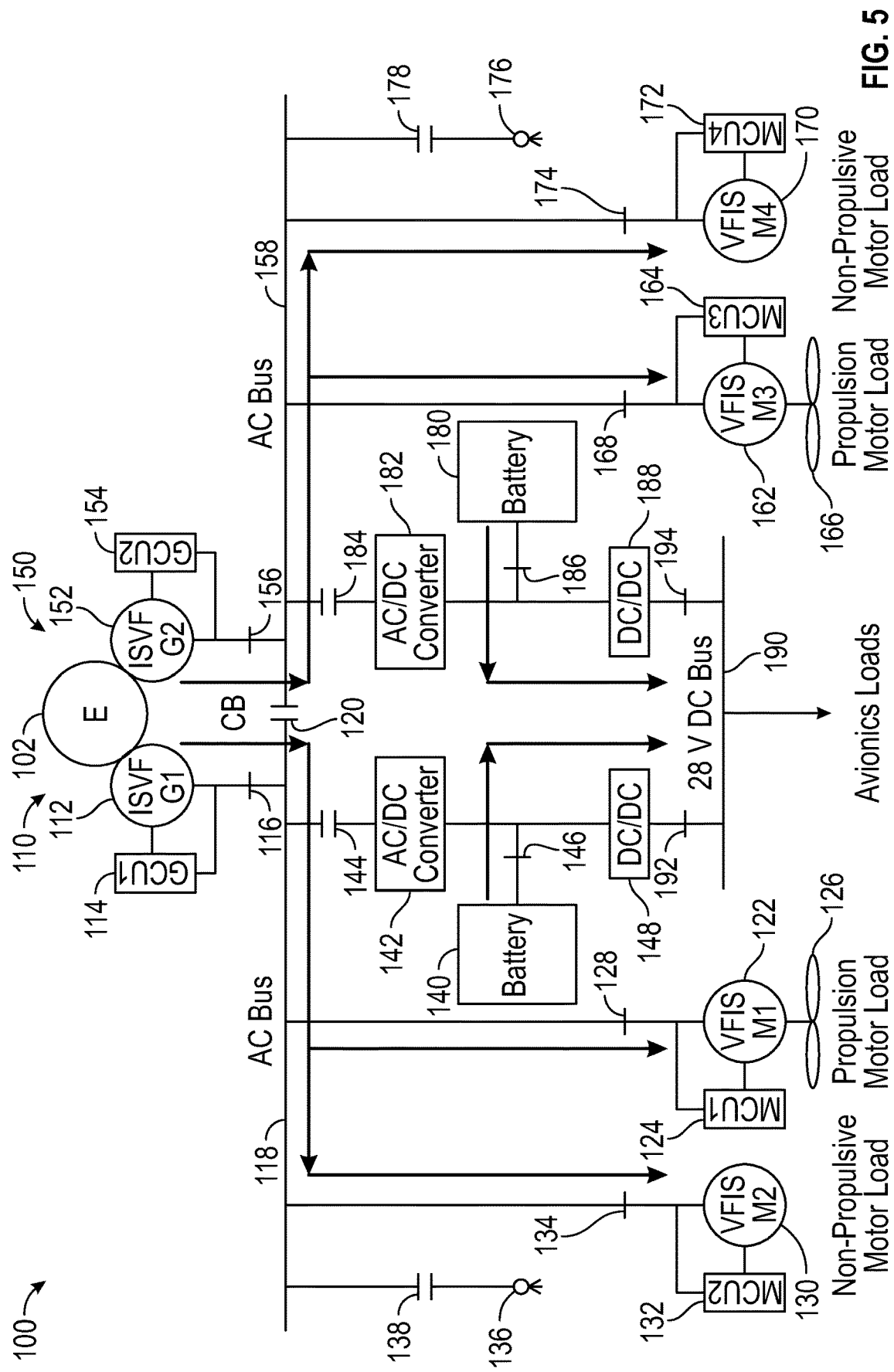
FIG. 5 is a block diagram depicting a hybrid electric propulsion system in a cruise power distribution mode.

Referring to FIG. 5, the system 100 is depicted in a configuration that may be used for power distribution during aircraft cruising. As shown in FIG. 5, in the first channel 110, the first switch 116, the second switch 128, and the sixth switch 134 may be closed. As such, the first generator 112, the first motor 122 and the second motor 130 may be electrically connected to the first AC bus 118. The first AC/DC converter 142 may be electrically disconnected from the first AC bus 118. As such, power may flow from the first generator 112 to the first motor 122 and to the second motor 130 to power the motors 122, 130 with the first generator 112 without drawing power from the first battery 140. Further, the fifth switch 192, and the seventh switch 146 may be closed, to enable the first battery 140 to power the DC bus 190.

Similarly, in the second channel 150, the first additional switch 156, the second additional switch 168, and the sixth additional switch 174 may be closed. As such, the second generator 152, the third motor 162, and the fourth motor 170 may be electrically connected to the second AC bus 158. The second AC/DC converter 182 may be electrically disconnected from the second AC bus 158. As such, power may flow from the second generator to the third motor 162 and to the fourth motor 170 to power the motors 162, 170 with the second generator 152 without drawing power from the second battery 180. The second battery 180 may be used to assist in powering the DC bus 190 by closing the fifth additional switch 194 and the seventh additional switch 186.

Figure 6:
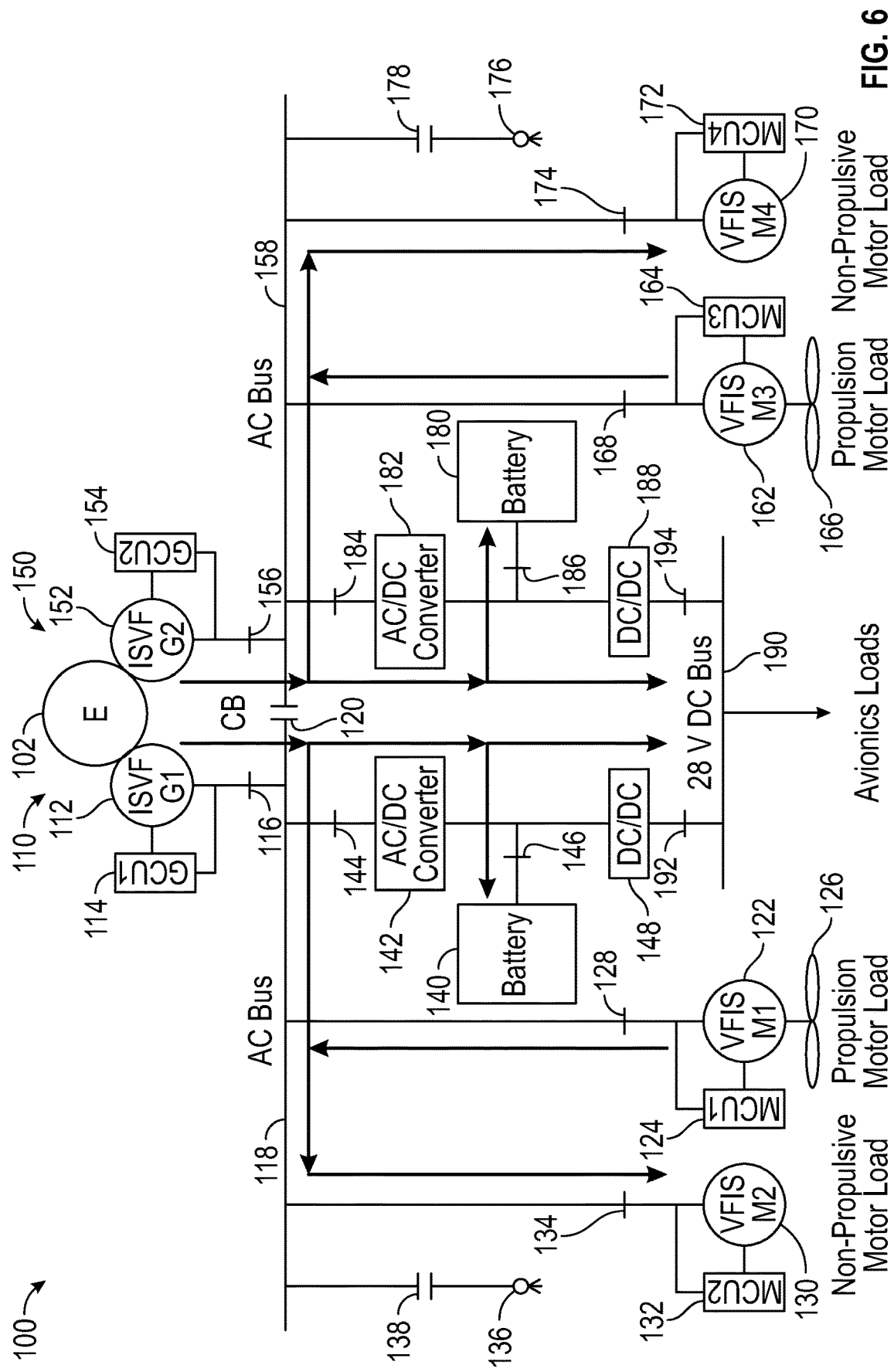
FIG. 6 is a block diagram depicting a hybrid electric propulsion system in a power distribution during descent and breaking mode.

Referring to FIG. 6, the system 100 is depicted in a configuration that may enable charging of the batteries 140, 180 during descent and braking. As shown in FIG. 6, in the first channel 110, the first switch 116, the second switch 128, the third switch 144, the sixth switch 134, and the seventh switch 146 may be closed. As such, the first generator 112, the first motor 122, the second motor 130, and the AC/DC converter 142 may be electrically connected to the first AC bus 118. Further, the fifth switch 192 may be closed such that the DC/DC converter 148 may be electrically connected to the DC bus 190.

In the configuration of FIG. 6, the first motor 122 may be operated in a generator mode to convert a reverse load on the first propulsion load 126 (e.g., a force applied to a rotor) into an AC power signal that may drive the first AC bus 118. Power may flow from the first generator 112 and the first motor 122 to the first AC bus 118. The combination of the first generator 112 and the first motor 122 may charge the first battery 140, drive the second motor 130, or both.

Similarly, in the second channel 150, the first additional switch 156, the second additional switch 168, the third additional switch 184, the sixth additional switch 174, and the seventh additional switch 186 may be closed. Further, the fifth additional switch 194 may be closed such that the second DC/DC converter 188 may be electrically connected to the DC bus 190.

Figure 7:
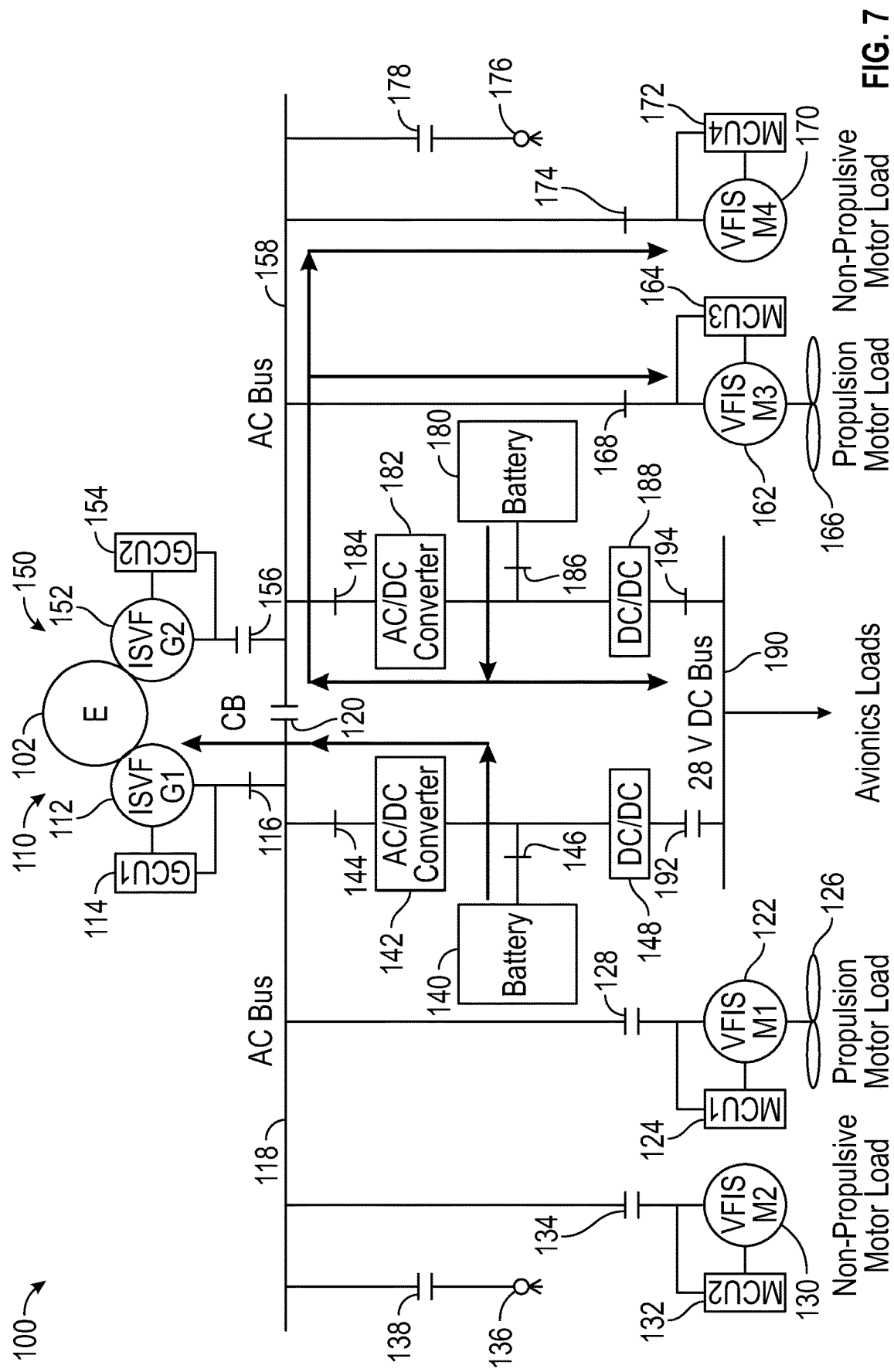
FIG. 7 is a block diagram depicting a hybrid electric propulsion system in an engine start by battery mode.

Referring to FIG. 7, the system 100 is depicted in a configuration that may enable an engine startup using the battery 140. As shown in FIG. 7, the first channel 110 may be configured differently from the second channel 150. In the first channel 110, the first switch 116, the third switch 144, and the seventh switch 146 may be closed with the remaining switches 128, 134, 138, 192 being open. As such, the first battery 140 may be electrically connected to the first AC/DC converter 142 and the first AC/DC converter 142 may be electrically connected to the first AC bus 118. The first and second motors 122, 130 may be electrically disconnected from the first AC bus 118. The first generator 112 may also be electrically connected to the first AC bus 118 and may be operated in a motor mode. Power from the battery 140 may be used to drive the first generator 112 as a motor to start the engine 102.

While the engine 102 is being started, in the second channel 150, the second additional switch 168, the third additional switch 184, the fifth additional switch 194, the sixth additional switch 174, and the seventh additional switch 186 may be closed. In this way, the second battery 180 may provide power for the third and fourth motors 162, 170, as well as for the DC bus 190. The configuration depicted in FIG. 7 may be used by an aircraft for starting the engine 102 when an external power source is not available, such as in air during a flight.

Figure 8:
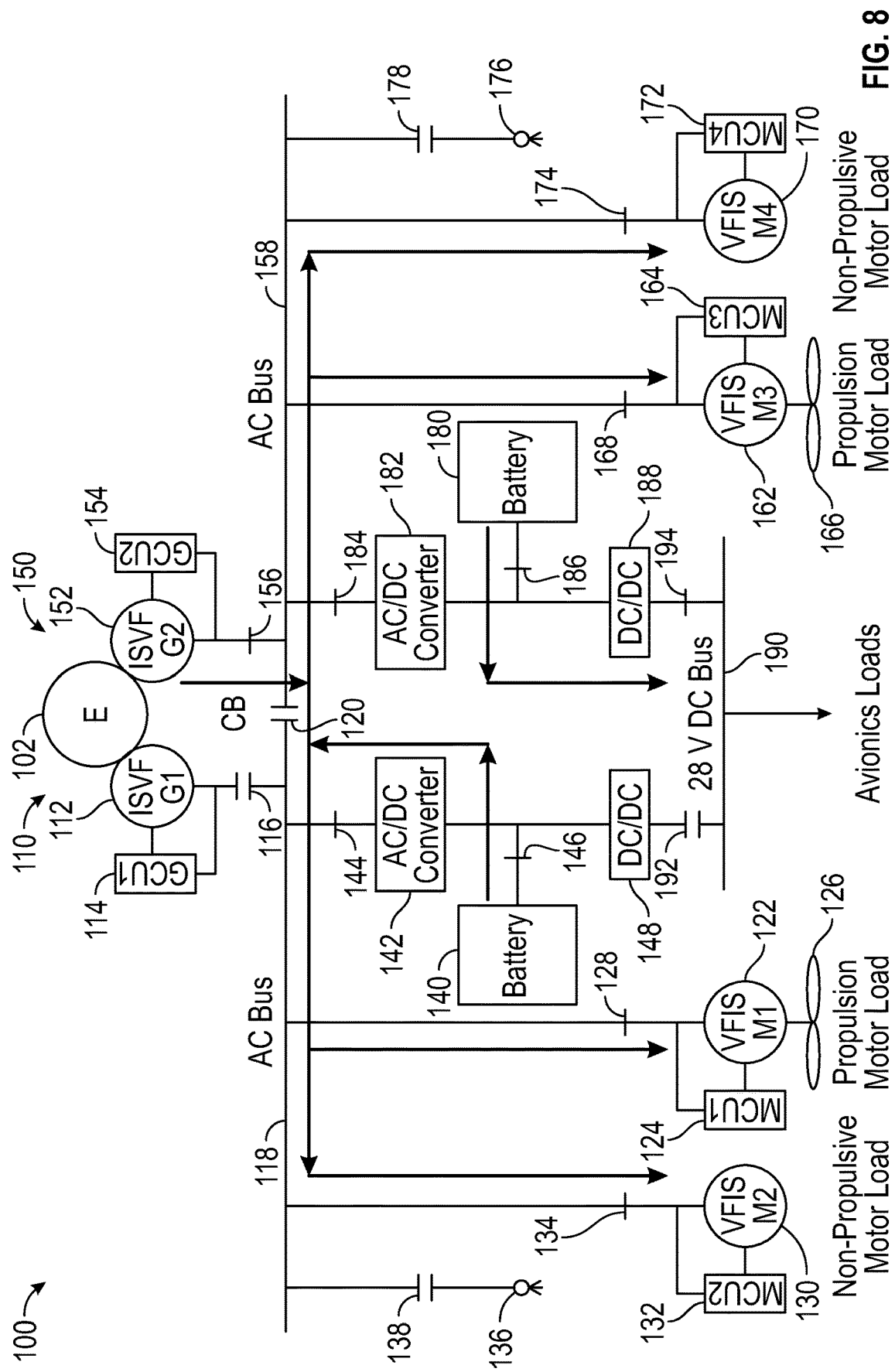
FIG. 8 is a block diagram depicting a hybrid electric propulsion system in a single generator power distribution mode.

Referring to FIG. 8, the system 100 is depicted in a configuration that may enable power distribution from one of the generators 112, 152. As shown in FIG. 8, the first switch 116 may be opened to isolate the unused generator 112 from the first AC bus 118. In the first channel 110, the second switch 128, the third switch 144, the sixth switch 134, and the seventh switch 146 may be closed. The central switch 120 may likewise be closed to enable the second generator 152 to drive both the first AC bus 118 and the second AC bus 158. The first battery 140 may likewise assist in delivering power to both the first AC bus 118 and the second AC bus 158.

In the second channel 150, the first additional switch 156, the second additional switch 168, and the sixth additional switch 174 may be closed. The third additional switch 184 may be open to isolate the second battery 180 from the first and second AC buses 118, 158. The fifth additional switch 194 and the seventh additional switch 186 may be closed to enable the DC bus 190 to be powered by the second battery 180.

Figure 9A:
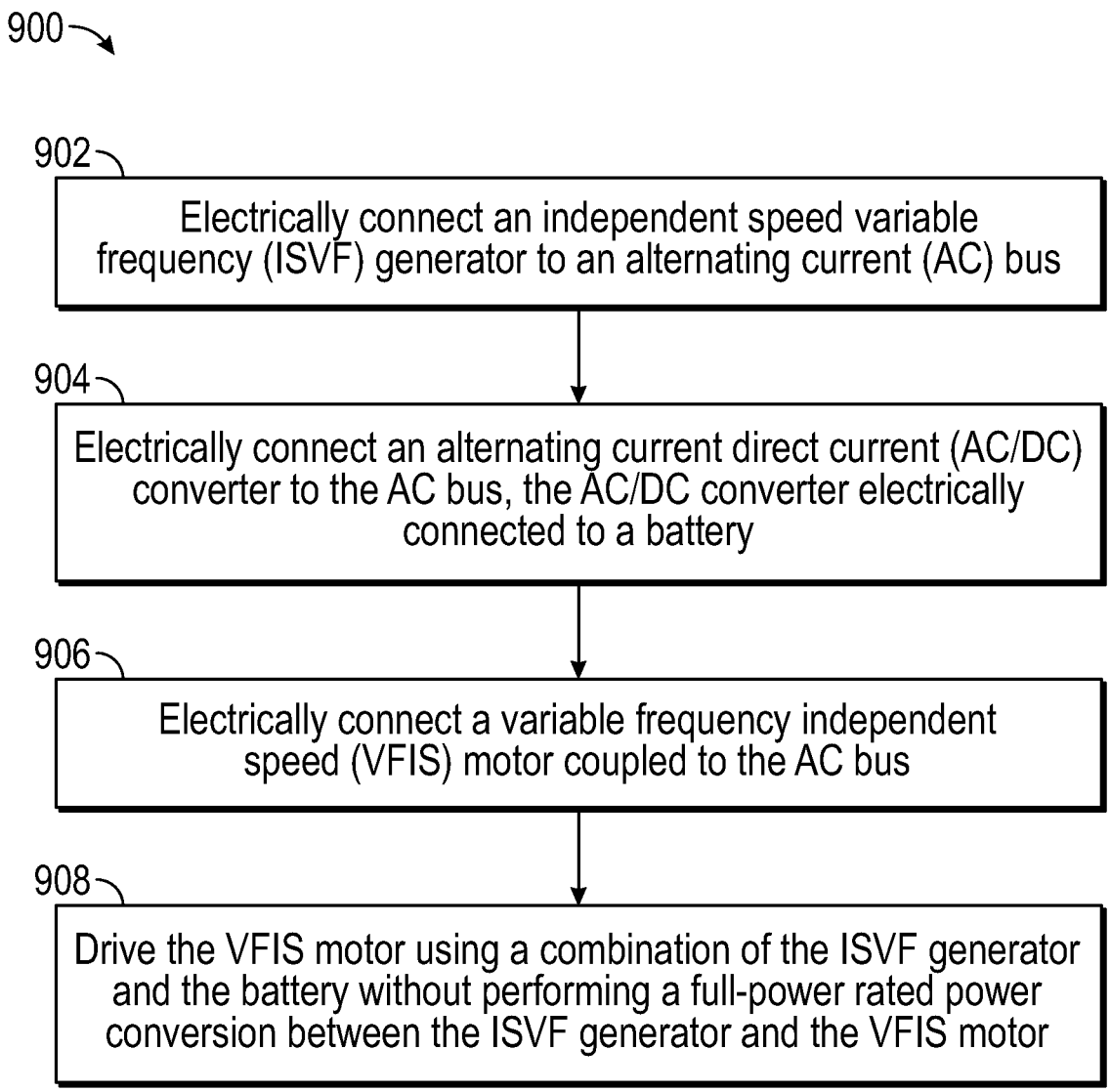
FIG. 9A is a flow diagram depicting a method for hybrid electric propulsion.

Referring to FIG. 9A, a method 900 for hybrid electric propulsion is depicted. The method 900 may include electrically connecting an ISVF generator to an AC bus, at 902. For example, the first generator 112 may be electrically connected to the first AC bus 118.

The method 900 may further include electrically connecting an AC/DC converter to the AC bus, the AC/DC converter electrically connected to a battery, at 904. For example, the first AC/DC converter 142 may be coupled to the first AC bus 118.

The method 900 may also include electrically connecting a VFIS motor coupled to the AC bus, at 906. For example, the first motor 122 may be coupled to the first AC bus 118.

The method 900 may include driving the VFIS motor using a combination of the ISVF generator and the battery without performing a full-power rated power conversion between the ISVF generator and the VFIS motor, at 908. For example, the first motor 122 may be driven by a combination of the first generator 112 and the first battery 140, without performing a full-power rated power conversion between the first generator 112 and the first motor 122.

A benefit of the method 900 is that by driving the first motor 122 with both the first generator 112 and the first battery 140, less stress may be lighter and more efficient generators may be used as compared to systems that may not include a battery configured to drive a propulsive load. Other advantages may exist.

Figure 9B:
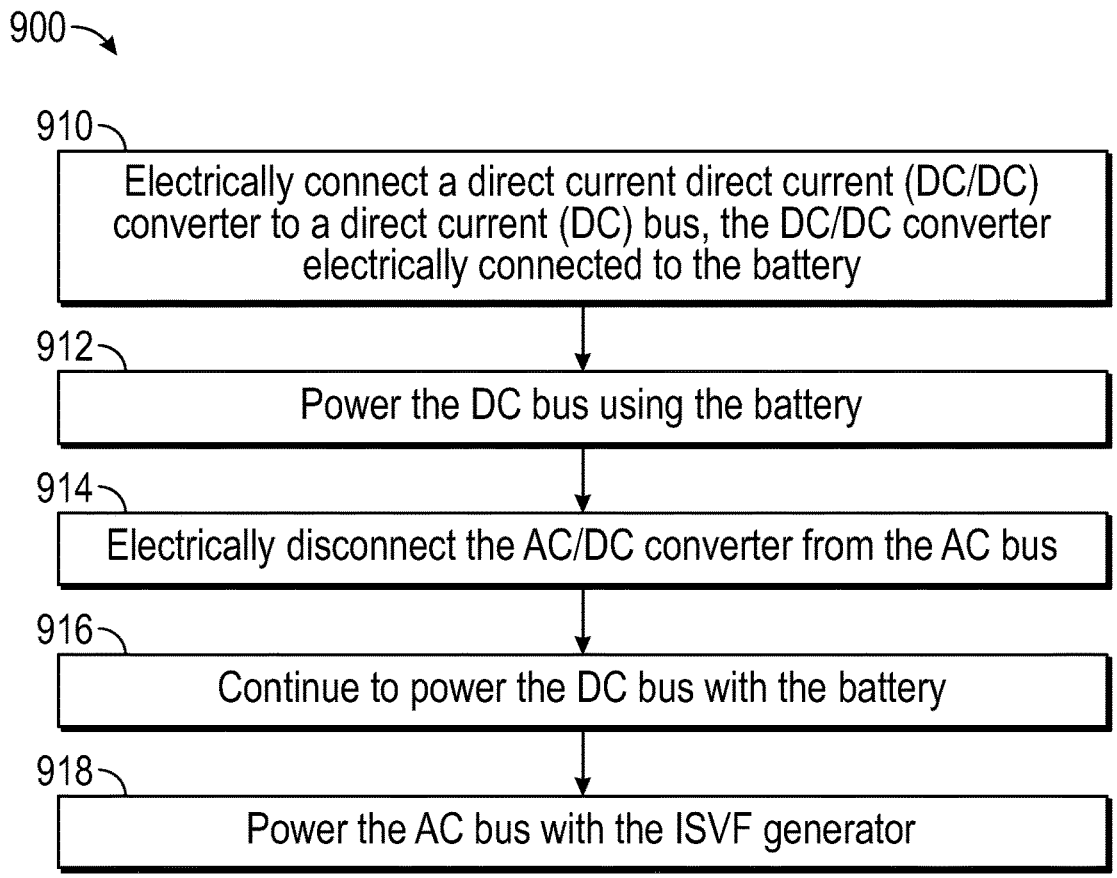
FIG. 9B is a flow diagram depicting a continuation of the method of FIG. 9A.

Referring to FIG. 9B, a continuation of the method 900 may include electrically connecting a DC/DC converter to a DC bus, at 910, the DC/DC converter electrically connected to the battery. The method 900 may further include powering the DC bus using the battery, at 912. At this point, FIG. 9B may correspond to the configuration depicted in FIG. 4. The method 900 may also include electrically disconnecting the AC/DC converter from the AC bus, at 914. The method 900 may include continuing to power the DC bus with the battery, at 916. The method 900 may further include powering the AC bus with the ISVF generator, at 918. At this point, FIG. 9B may correspond to the configuration depicted in FIG. 5.

Figure 9C:
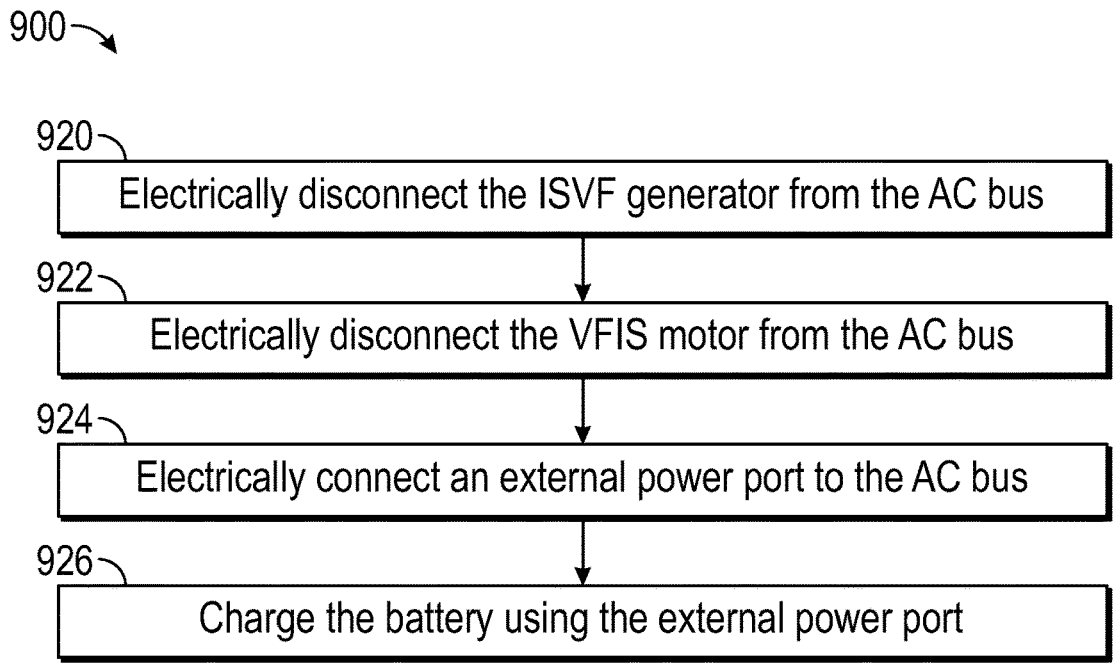
FIG. 9C is a flow diagram depicting a continuation of the method of FIG. 9A.

Referring to FIG. 9C, a continuation of the method 900 may include electrically disconnecting the ISVF generator from the AC bus, at 920. The method 900 may also include electrically disconnecting the VFIS motor from the AC bus, at 922. The method 900 may include electrically connecting an external power port to the AC bus, at 924. The method 900 may further include charging the battery using the external power port, at 926. For example, FIG. 9C may correspond to the configuration depicted in FIG. 2.

Figure 9D:
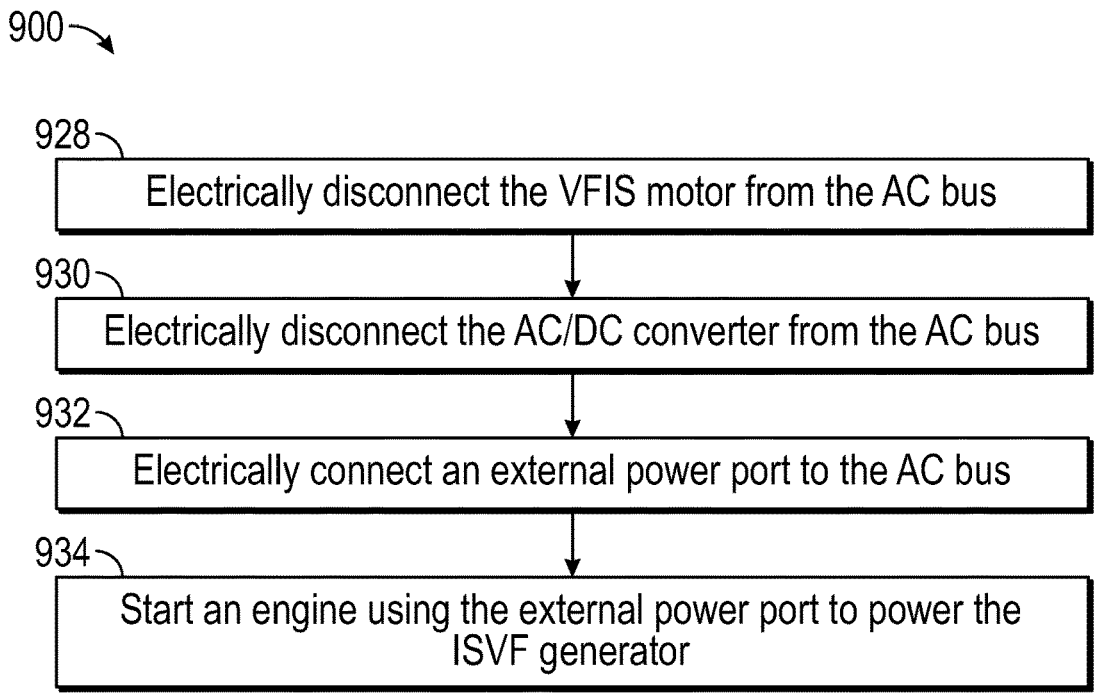
FIG. 9D is a flow diagram depicting a continuation of the method of FIG. 9A.

Referring to FIG. 9D, a continuation of the method 900 may include electrically disconnecting the VFIS motor from the AC bus, at 928. The method 900 may further include electrically disconnecting the AC/DC converter from the AC bus, at 930. The method may also include electrically connecting an external power port to the AC bus, at 932. The method 900 may include starting an engine using the external power port to power the ISVF generator, at 934. For example, FIG. 9D may correspond to the configuration depicted in FIG. 3.

Figure 9E:
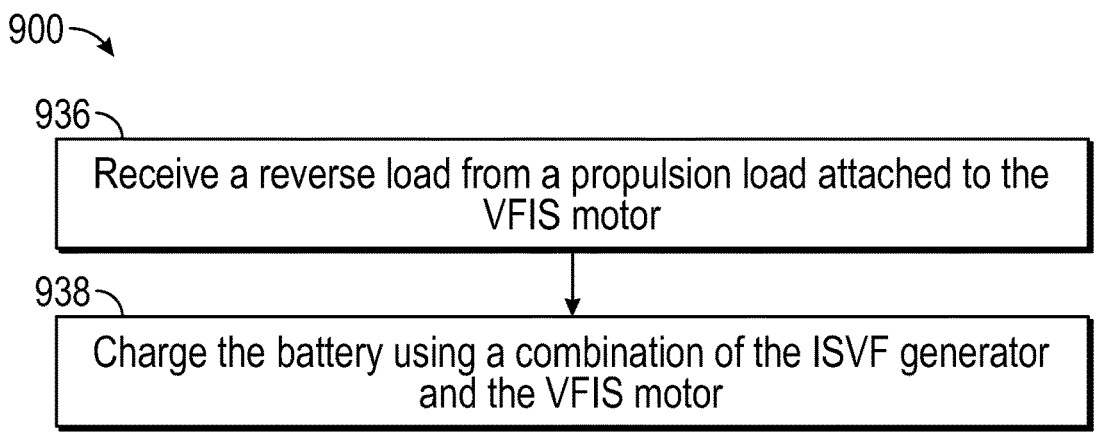
FIG. 9E is a flow diagram depicting a continuation of the method of FIG. 9A.

Referring to FIG. 9E, a continuation of the method 900 may include receiving a reverse load from a propulsion load attached to the VFIS motor, at 936. The method 900 may further include charging the battery using a combination of the ISVF generator and the VFIS motor, at 938. For example, FIG. 9E may correspond to the configuration depicted in FIG. 6.

Figure 9F:
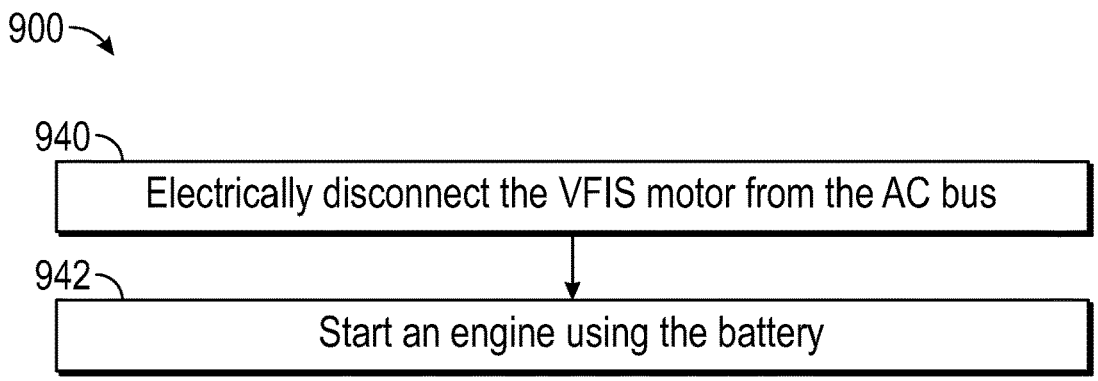
FIG. 9F is a flow diagram depicting a continuation of the method of FIG. 9A.

Referring to FIG. 9F, a continuation of the method 900 may include electrically disconnecting the VFIS motor from the AC bus, at 940. The method 900 may further include starting an engine using the battery, at 942. For example, FIG. 9F may correspond to the configuration depicted in FIG. 7.

Figure 9G:
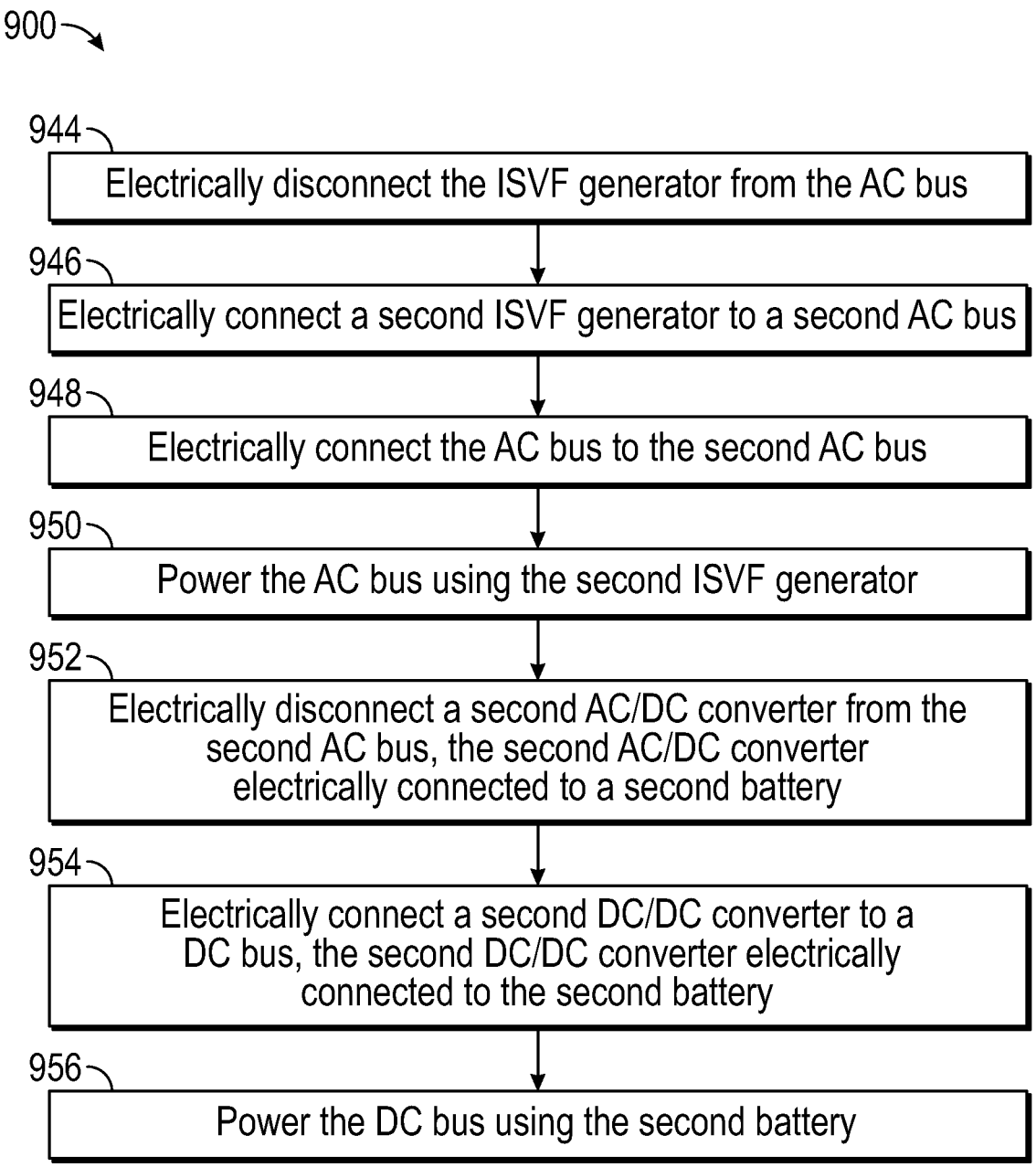
FIG. 9G is a flow diagram depicting a continuation of the method of FIG. 9A.

Referring to FIG. 9G, a continuation of the method 900 may include electrically disconnecting the ISVF generator from the AC bus, at 944. The method 900 may further include electrically connecting a second ISVF generator to a second AC bus, at 946. The method 900 may also include electrically connecting the AC bus to the second AC bus, at 948. The method 900 may include powering the AC bus using the second ISVF generator, at 950. The method 900 may further include electrically disconnecting a second AC/DC converter from the second AC bus, at 952, the second AC/DC converter electrically connected to a second battery. The method 900 may also include electrically connecting a second DC/DC converter to a DC bus, at 954, the second DC/DC converter electrically connected to the second battery. The method 900 may include powering the DC bus using the second battery, at 956. FIG. 9G may correspond to the configuration depicted in FIG. 8.

Figure 10A:
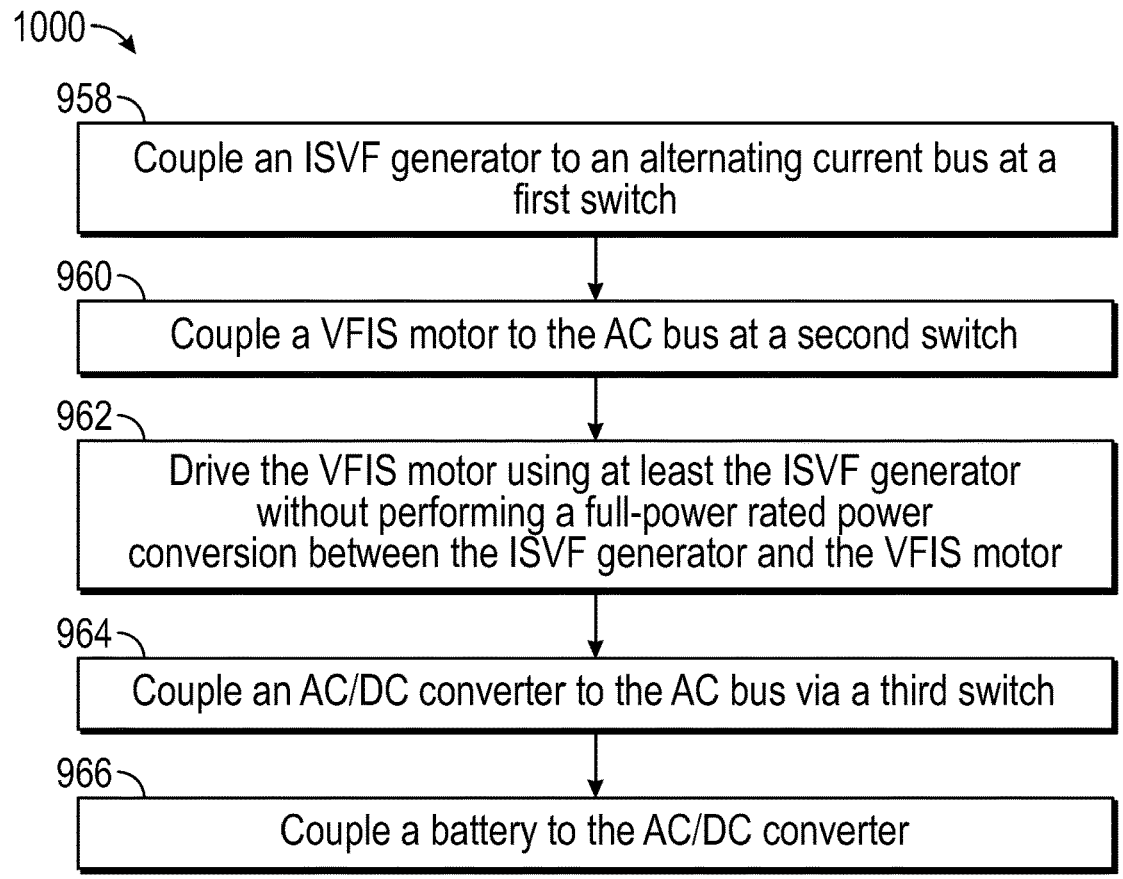
FIG. 10A is a flow diagram depicting a method for hybrid electric propulsion.

Referring to FIG. 10A, a method 1000 for hybrid electric propulsion is depicted. The method 1000 may include coupling an ISVF generator to an AC bus at a first switch, at 958. For example, the first generator 112 may be coupled to the first AC bus 118 via the first switch 116.

The method 1000 may further include coupling a VFIS motor to the AC bus at a second switch, at 960. For example, the first motor 122 may be coupled to the first AC bus 118 at the second switch 128.

The method 1000 may include driving the VFIS motor using a combination of the ISVF generator and the battery without performing a full-power rated power conversion between the ISVF generator and the VFIS motor, at 962. For example, the first motor 122 may be driven by a combination of the first generator 112 and the first battery 140, without performing a full-power rated power conversion between the first generator 112 and the first motor 122.

The method 1000 may include coupling an AC/DC converter to the AC bus via a third switch, at 964. For example, the AC/DC converter 142 may be coupled to the AC bus 118 via the third switch 144.

The method 1000 may further include coupling a battery to the AC/DC converter, at 966. For example, the battery 140 may be coupled to the AC/DC converter 142.

Figure 10B:
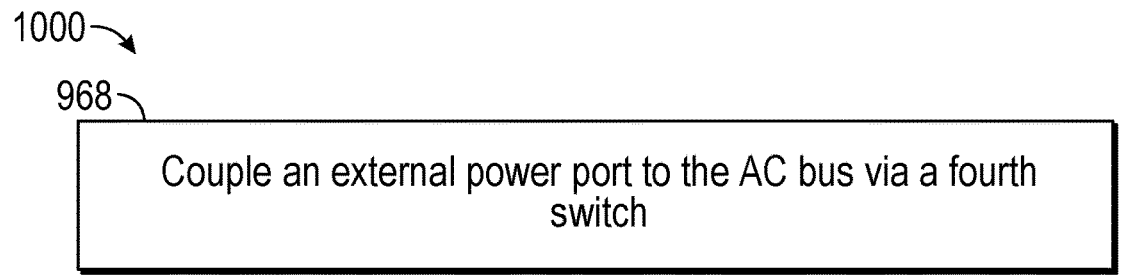
FIG. 10B is a flow diagram depicting a continuation of the method of FIG. 9A.
Figure 10C:
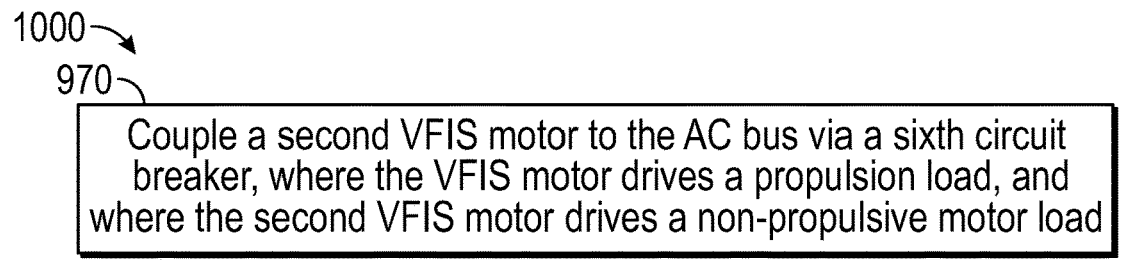
FIG. 10C is a flow diagram depicting a continuation of the method of FIG. 9A.

Referring to FIG. 10B, a continuation of the method 1000 may include electrically disconnecting a second AC/DC converter from the second AC bus, at 968, the second AC/DC converter electrically connected to a second battery. Referring to FIG. 10C, a continuation of the method 1000 may include coupling a second VFIS motor to the AC bus via sixth switch, where the second VFIS motor drives a non-propulsive motor load, at 970.

Although various embodiments have been shown and described, the present disclosure is not so limited and will be understood to include all such modifications and variations as would be apparent to one skilled in the art.

What is claimed is:

1. A hybrid electric propulsion system comprising:
an independent speed variable frequency (ISVF) generator coupled to an alternating current (AC) bus via a first switch, wherein the ISVF generator is capable of generating an AC signal having a frequency that is independent from a rotor speed of the ISVF generator without performing a full-power rated power conversion;
a variable frequency independent speed (VFIS) motor coupled to the AC bus via a second switch, the system omitting circuitry to perform the full-power rated power conversion between the ISVF generator and the VFIS motor;
an alternating current direct current (AC/DC) converter coupled to the AC bus via a third switch;
a battery coupled to the AC/DC converter;
a second ISVF generator coupled to a second AC bus via a first additional switch, the AC bus coupled to the second AC bus via a central switch;
a second VFIS motor coupled to the second AC bus via a second additional switch, the system omitting circuitry to perform a full-power rated power conversion between the second ISVF generator and the second VFIS motor;
a second AC/DC converter coupled to the second AC bus via a third additional switch; and
a second battery coupled to the second AC/DC converter.

2. The system of claim 1, further comprising:
an external power port coupled to the AC bus via a fourth switch.

3. The system of claim 1, further comprising:
a direct current (DC) bus; and
a direct current direct current (DC/DC) converter coupled to the DC bus via a fifth switch.

4. The system of claim 3, wherein the VFIS motor is configured to drive a propulsion load, the system further comprising:
a second VFIS motor coupled to the AC bus via a sixth switch, the second VFIS motor configured to drive a non-propulsive motor load.

5. The system of claim 4, further comprising:
a sixth switch, the battery coupled to both the AC/DC converter and the DC/DC converter via the sixth switch.

6. The system of claim 1, wherein the first switch, the second switch, and the third switch are contactors, each contactor including an electro-mechanical circuit breaker or a solid-state power controller (SSPC).

7. The system of claim 1, wherein the system comprises a first power channel and a second power channel, wherein the ISVF generator, the VFIS motor, the AC/DC converter, and the battery correspond to the first power channel, and wherein the second ISVF generator, the second VFIS motor, the second AC/DC converter, and the second battery correspond to the second power channel.

8. A method for hybrid electric propulsion comprising:
electrically connecting an independent speed variable frequency (ISVF) generator to an alternating current (AC) bus, wherein the ISVF generator is capable of generating an AC signal having a frequency that is independent from a rotor speed of the ISVF generator without performing a full-power rated power conversion;
electrically connecting an alternating current direct current (AC/DC) converter to the AC bus, the AC/DC converter electrically connected to a battery;
electrically connecting a variable frequency independent speed (VFIS) motor to the AC bus;
driving the VFIS motor using a combination of the ISVF generator and the battery without performing the full-power rated power conversion between the ISVF generator and the VFIS motor;
electrically disconnecting the ISVF generator from the AC bus;
electrically connecting a second ISVF generator to a second AC bus;
electrically connecting the AC bus to the second AC bus; and
powering the AC bus using the second ISVF generator.

9. The method of claim 8, further comprising:
electrically connecting a direct current direct current (DC/DC) converter to a direct current (DC) bus, the DC/DC converter electrically connected to the battery; and
powering the DC bus using the battery.

10. The method of claim 9, further comprising:
electrically disconnecting the AC/DC converter from the AC bus;
continuing to power the DC bus with the battery; and
powering the AC bus with the ISVF generator.

11. The method of claim 8, further comprising:
electrically disconnecting the ISVF generator from the AC bus;
electrically disconnecting the VFIS motor from the AC bus;
electrically connecting an external power port to the AC bus; and
charging the battery using the external power port.

12. The method of claim 8, further comprising:
electrically disconnecting the VFIS motor from the AC bus;
electrically disconnecting the AC/DC converter from the AC bus;
electrically connecting an external power port to the AC bus; and
starting an engine using the external power port to power the ISVF generator.

13. The method of claim 8, further comprising:
receiving a reverse load from a propulsion load attached to the VFIS motor; and
charging the battery using a combination of the ISVF generator and the VFIS motor.

14. The method of claim 8, further comprising:
electrically disconnecting the VFIS motor from the AC bus; and
starting an engine using the battery.

15. The method of claim 8, further comprising:
electrically disconnecting a second AC/DC converter from the second AC bus, the second AC/DC converter electrically connected to a second battery;
electrically connecting a second DC/DC converter to a DC bus, the second DC/DC converter electrically connected to the second battery; and
powering the DC bus using the second battery.

16. A method for hybrid electric propulsion comprising:
coupling an independent speed variable frequency (ISVF) generator to an alternating current (AC) bus at a first switch, wherein the ISVF generator is capable of generating an AC signal having a frequency that is independent from a rotor speed of the ISVF generator without performing a full-power rated power conversion;
coupling a variable frequency independent speed (VFIS) motor to the AC bus at a second switch;
driving the VFIS motor using at least the ISVF generator without performing the full-power rated power conversion between the ISVF generator and the VFIS motor;
coupling an alternating current direct current (AC/DC) converter to the AC bus via a third switch;
coupling a battery to the AC/DC converter at a fourth switch;
coupling a second ISVF generator to a second AC bus at a fifth switch;
coupling the AC bus to the second AC bus at a sixth switch; and
powering the AC bus using the second ISVF generator.

17. The method of claim 16, further comprising:
coupling an external power port to the AC bus via a seventh switch.

18. The method of claim 16, further comprising:
coupling a second VFIS motor to the AC bus via an eighth switch, wherein the VFIS motor drives a propulsion load, and wherein the second VFIS motor drives a non-propulsive motor load.

19. The method of claim 16, further comprising:
coupling a third VFIS motor to the second AC bus via a ninth switch;
driving the third VFIS motor using at least the second ISVF generator without performing the full-power rated power conversion between the second ISVF generator and the third VFIS motor.

20. The method of claim 19, further comprising:
coupling a fourth VFIS motor to the second AC bus via a tenth switch;
driving the fourth VFIS motor using at least the second ISVF generator without performing the full-power rated power conversion between the second ISVF generator and the fourth VFIS motor.

* * * * *